United States Patent [19]

Carr

[11] 4,413,042
[45] Nov. 1, 1983

[54] INERT GAS REJECTION SYSTEM FOR METAL HALOGEN BATTERIES

[75] Inventor: Peter Carr, Utica, Mich.

[73] Assignee: Energy Development Associates, Inc., Madison Heights, Mich.

[21] Appl. No.: 372,088

[22] Filed: Apr. 26, 1982

[51] Int. Cl.³ .............................................. H01M 2/38
[52] U.S. Cl. ........................................ 429/51; 429/15; 429/105
[58] Field of Search ....................... 429/51, 14, 15, 19, 429/20, 70, 105, 101

[56] References Cited

U.S. PATENT DOCUMENTS

| | | | |
|---|---|---|---|
| 3,713,888 | 1/1973 | Symons | 136/6 |
| 3,993,502 | 11/1976 | Bjorkmar, Jr. | 429/51 |
| 4,001,036 | 1/1977 | Berman et al. | 429/67 |
| 4,144,381 | 3/1979 | Fatica | 429/50 |
| 4,146,680 | 3/1979 | Carr et al. | 429/51 |
| 4,256,554 | 3/1981 | Bjorkman, Jr. | 204/260 X |
| 4,257,867 | 3/1981 | Hammond | 204/265 |

OTHER PUBLICATIONS

"Development of the Zinc-Chlorine Battery for Utility Applications", Electric Power Res. Inst., EM1051, Apr. 1979, p. 2-1.

*Primary Examiner*—Charles F. LeFevour
*Attorney, Agent, or Firm*—Harness, Dickey & Pierce

[57] ABSTRACT

A method of removing inert gases from a metal halogen electrolyte battery system in which hydrogen is generated along with other inerts such as carbon dioxide, carbon monoxide and oxygen, said method comprising, pressurizing the gas space above the sump to a preset pressure above ambient, and subsequently venting the hydrogen and other inert gases from the gas space through an absorber means which removes trace quantities of chlorine from the gases.

5 Claims, 1 Drawing Figure

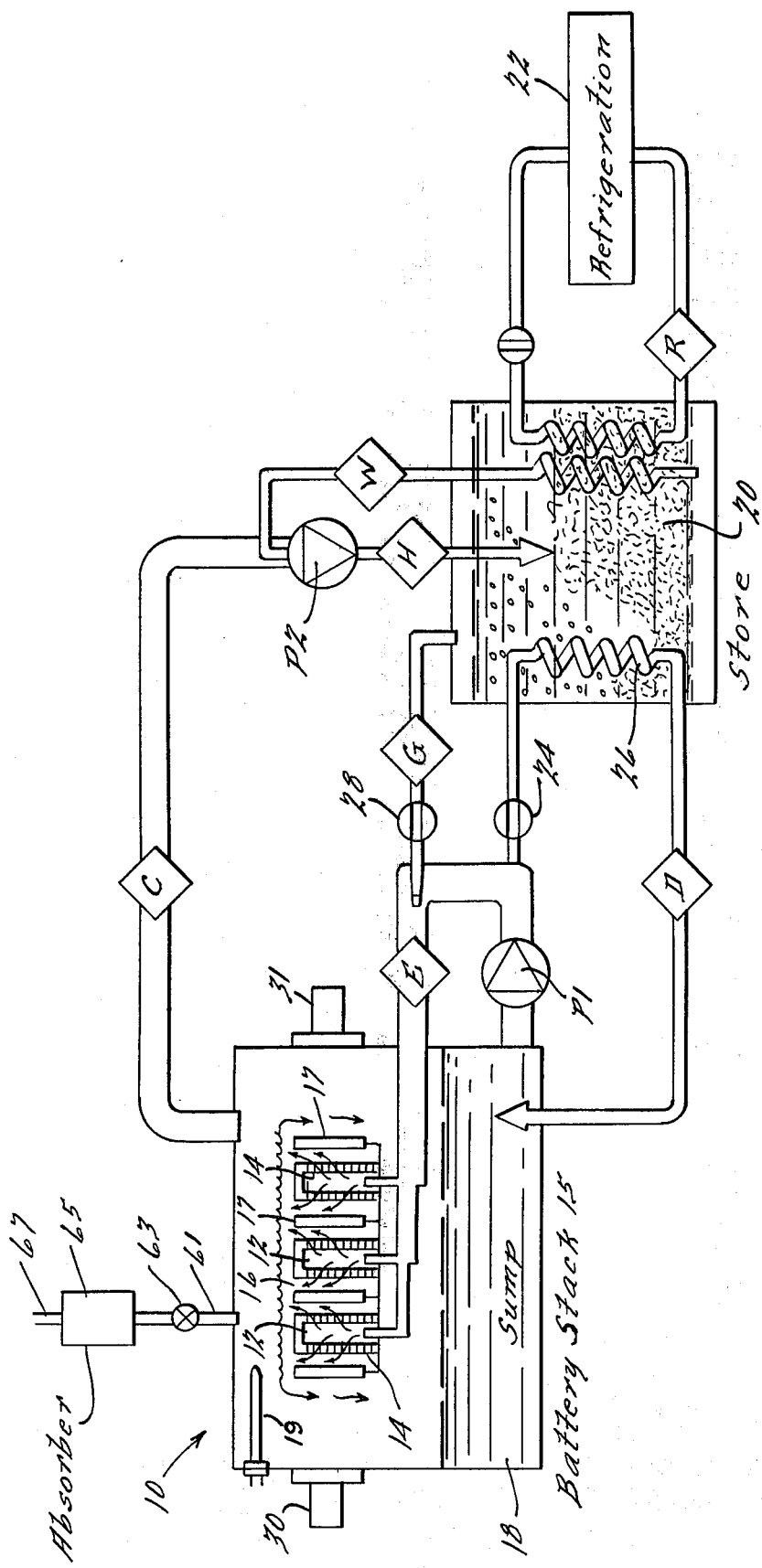

INERT GAS REJECTION SYSTEM FOR METAL HALOGEN BATTERIES

BACKGROUND OF THE INVENTION

The present invention broadly relates to improved electrical energy storage systems, and more particularly the invention relates to a novel method of removing inert gases from a metal halogen battery system.

The electrical energy storage systems of the type referred to herein (e.g., a zinc-chlorine battery) utilize a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen, and is circulated between the electrode area and a storage area containing halogen hydrate, which progressively decomposes during a normal discharge of the electrical energy system, liberating additional elemental halogen to be consumed at the positive electrode. Electrical energy storage systems or battery systems of this type are described in prior patents owned by the same assignee as the present invention, such as U.S. Pat. No. 3,713,888, U.S. Pat. No. 3,993,502, U.S. Pat. No. 4,001,036, and U.S. Pat. No. 4,146,680. Such systems are also described in published reports prepared by the assignee herein, such as EPRI Report EM-1051 (Parts 1-3) dated April 1979, published by the Electric Power Research Institute. The specific teachings of the aforementioned U.S. patents and the EPRI Report are incorporated herein by reference.

In the operation of a metal halogen battery, such as an aqueous zinc-chloride battery system with graphite and/or other stable electrode substrates, a finite proportion of gases other than the desired chlorine are evolved. With graphite electrodes, these other gases typically consist of carbon dioxide, carbon monoxide, and oxygen and hydrogen. Because of the acid electrolyte used in such battery systems, hydrogen is the major foreign gas liberated. In the past, photochemical techniques such as those described by Fatica in U.S. Pat. No. 4,144,381 have been utilized to recycle hydrogen to the electrolyte as hydrogen chloride. It is also to be recognized that the removal of carbon dioxide, carbon monoxide, and oxygen from the system will lead to slow acidification of the battery, therefore, from time to time hydrogen should be removed from such a battery system along with the other species so as to balance the pH of the battery. Slow accumulation of carbon dioxide, carbon monoxide, and oxygen causes a decrease in both chlorine hydrate formation ability and the solubility of chlorine in the electrolyte for discharge, thereby resulting in a decreased battery performance.

Several techniques for removing inert gases (i.e., inert gases being defined herein as gases other than chlorine), while maintaining the chlorine balance of the system have been disclosed. For example, see Bjorkman U.S. Pat. No. 4,256,554, Fatica U.S. Pat. No. 4,144,381, and Hammond et al U.S. Pat. No. 4,257,867. Those techniques typically involved a chlorine/chlorine electrowinning cell as the means of effecting the separation and elimination of the inert gases. It is the object of the present invention to provide a different, unique, and yet simple technique of removing inert gases from metal halogen battery systems. Other objects, features and advantages of the present invention will become apparent from the subsequent description and the appended claims taken in conjunction with the accompanying drawing. It is also to be understood that the invention herein is applicable to numerous different constructional arrangements of metal halogen battery systems.

BRIEF DESCRIPTION OF THE DRAWING

The drawing FIGURE illustrates a schematic of the battery construction in accordance with the invention herein.

SUMMARY OF THE INVENTION

The technique for separation and rejection of the inert gases described and referred to in this invention does not require an additional electro-chemical device to be incorporated in the system. The technique disclosed herein involves the circulating of electrolyte over the charged or partially charged stack while not allowing chlorine replenishment to the stack system from the store. This recirculation by self discharge of the battery consumes all of the free chlorine in the gas space associated with the stack system (i.e., the stack system being the sump, the sump gas space and the electrode area and manifolding), leaving only the inert gases within the gas space. By circulating the electrolyte for a period of time, hydrogen is generated from the zinc which remains on the electrodes, thereby pressurizing the gas space above the sump to a preset pressure above ambient. The gas space can then be safely vented through an absorber means to the atmosphere, thus efficiently removing a substantial fraction of the inert gases from the system. The absorber functions to remove trace quantities of chlorine from the gases being vented. Depending on gas space volume, and on the electrolyte being used, the invention herein is carried out such that the inert gas rejection phase of the battery operation is accomplished at any stand time for the battery, that is, when there is some metal (e.g., zinc) remaining on the electrodes, and it is immaterial whether the amount of metal left on the electrodes is large or small. In addition the invention herein contemplates that for mobile battery applications (e.g., electric vehicle battery applications) the preset pressure in the gas space can be caused to occur by pumping a predetermined amount of the aqueous electrolyte from the store over to the battery stack, to thus hydraulically pressurize the gas space above the stack, and thereafter, venting the inert gases from the system through a suitable venting means which also includes an absorber for removing trace quantities of chlorine.

DESCRIPTION OF THE INVENTION

The drawing illustrates one embodiment of a zinc-chlorine battery system in accordance with the invention. The battery system is designated 10 and means are provided to achieve the desired flows of chlorine, electrolyte, water and heat, with a general description thereof now following.

In charge, pump P-1 delivers electrolyte to pockets 12 between pairs of porous graphite chlorine electrodes 14 in the battery stack 15. The electrolyte passes through the porous chlorine electrodes 14 into the chamber 16 between the zinc electrodes 17 and chlorine electrodes 14, flows up between the electrodes and eventually spills through high resistance cascades back into the sump 18. Chlorine gas is pumped by the pump designated P-2 through line C. Before entering the pump P-2, the chlorine gas is mixed with chilled water which passes through line W and comes from the bottom of the store 20. The chlorine and chilled water are mixed in the gas pump P-2, chlorine hydrate forms, and the chlorine hydrate-water mixture is deposited in the store 20 through line H. The water in line W is chilled by passage through a heat exchanger. Glycol cooled by means of a refrigeration system 22 is passed through the line R into the heat exchanger.

In discharge, the valve 24 in line D is open, permitting a stream of warm electrolyte to pass through a heat exchanger 26 in the store. Chlorine is formed by decomposition of chlorine hydrate in the store 20. On development of the required pressure in the store, the valve 28 in line G is opened and the chlorine passes into line E on the higher pressure side of the electrolyte pump P-1. The chlorine dissolves in the electrolyte which is then fed to the porous graphite chlorine electrodes 14. The battery stack 15 can now be discharged, wherein electrode dissolution of the zinc occurs at the zinc electrode 17, reduction of the dissolved chlorine occurs at the chlorine electrode 14, power is available at the battery terminals 30, 31, and zinc chloride is formed in the electrolyte by reaction of zinc and chlorine to form zinc chloride.

As noted earlier herein, the technique for separation and rejection of the inert gases in accordance with the invention involves circulating electrolyte over the charged or partially charged stack while not allowing chlorine replenishment to the stack system from the store. This may be carried out, for example, by activating the pump P-1 to circulate electrolyte from the sump through the line E over the electrode in the battery stack 15, while maintaining lines C, D and G closed such that no flow occurs through those lines. This recirculation of electrolyte through pump P-1 and over the electrodes in the battery stack 15 consumes all of the free chlorine in the stack system, leaving only the inerts within the gas space, and by circulating the electrolyte for a sufficient period of time, hydrogen is generated from the remaining zinc on the electrodes, thereby pressurizing the gas space above the sump 18 to a desired preset pressure above ambient. The photochemical reactor 19 (e.g., a fluorescent light) operates to react chlorine gas with hydrogen gas to form hydrogen chloride which re-disperses or dissolves in the electrolyte. The gas space is then safely vented through conduit means 61 and vent valve 63, and thereafter through the absorber means 65 which absorber removes any trace amounts of chlorine that might still be left in the inert gases before they are vented to atmosphere through the conduit 67.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method of removing inert gases from a metal halogen electrolyte battery system in which hydrogen is generated along with other inerts, such as carbon dioxide, carbon monoxide, oxygen, or the like, said battery including a stack, sump, and electrolyte store, said method comprising, circulating electrolyte over the battery stack with the stack being at least partially charged while preventing halogen replenishment to the battery stack from the battery store, thereby generating hydrogen from the metal electrode to cause a positive pressure above ambient in the gas space associated with the battery sump, subsequently removing the hydrogen and other inert gases from the system by venting the gases through an absorber means which removes trace quantities of chlorine from the gases.

2. The invention of claim 1 wherein,
said metal halogen battery system is of the zinc-chlorine type.

3. A method of removing inert gases from a metal halogen electrolyte battery system in which hydrogen is generated along with other inerts such as carbon dioxide, carbon monoxide, oxygen, or the like, said battery system including a stack, sump, and electrolyte store, said method comprising, pumping electrolyte from the store to the stack to hydraulically pressurize the gas space above the stack, subsequently removing the hydrogen and other inert gases from the gas space by venting the gases through an absorber means which removes trace quantities of chlorine from the gases.

4. The invention of claim 3 wherein, said electrolyte is an aqueous zinc chloride electrolyte.

5. A method of removing inert gases from a metal halogen electrolyte battery system in which hydrogen is generated along with other inerts such as carbon dioxide, carbon monoxide, and oxygen, said method comprising, circulating electrolyte over the battery stack with the stack being at
least partially charged, while preventing halogen replenishment to the battery stack from the battery store, thereby generating hydrogen from the metal electrode to cause a positive pressure above ambient in the gas space above the battery sump, subsequently removing the hydrogen and other inert gases from the system through removal conduit means.

* * * * *